(12) United States Patent
Dewald et al.

(10) Patent No.: US 8,792,098 B2
(45) Date of Patent: Jul. 29, 2014

(54) SYSTEM AND METHOD FOR HYPERSPECTRAL ILLUMINATION

(75) Inventors: Duane Scott Dewald, Dallas, TX (US);
Karel J. Zuzak, Arlington, TX (US);
William Boyd Werner, Austin, TX (US)

(73) Assignee: Digital Light Innovations, Austin, TX (US)

( * ) Notice: Subject to any disclaimer, the term of this patent is extended or adjusted under 35 U.S.C. 154(b) by 158 days.

(21) Appl. No.: 13/487,127

(22) Filed: Jun. 1, 2012

(65) Prior Publication Data

US 2012/0307081 A1    Dec. 6, 2012

Related U.S. Application Data

(60) Provisional application No. 61/492,139, filed on Jun. 1, 2011, provisional application No. 61/494,717, filed on Jun. 8, 2011.

(51) Int. Cl.
*G01N 21/55*    (2014.01)

(52) U.S. Cl.
USPC ..................... 356/445; 362/249.02

(58) Field of Classification Search
CPC ........... F21V 9/00; H04N 5/225; G01N 21/55
USPC ......................................... 356/445
See application file for complete search history.

(56) References Cited

U.S. PATENT DOCUMENTS

| | | | | |
|---|---|---|---|---|
| 5,282,121 A * | 1/1994 | Bornhorst et al. | ............ | 362/294 |
| 5,372,135 A | 12/1994 | Mendelson et al. | | |
| 6,623,144 B2 * | 9/2003 | Bornhorst | ..................... | 362/318 |
| 7,219,086 B2 | 5/2007 | Geshwind et al. | | |
| 7,586,674 B2 | 9/2009 | O'Connell | | |
| 7,852,553 B2 | 12/2010 | Tsutsui et al. | | |
| 2002/0001080 A1 * | 1/2002 | Miller et al. | .................. | 356/326 |
| 2006/0241495 A1 | 10/2006 | Kurtz | | |
| 2007/0024946 A1 | 2/2007 | Panasyuk et al. | | |
| 2007/0249913 A1 | 10/2007 | Freeman et al. | | |
| 2007/0290145 A1 | 12/2007 | Viellerobe et al. | | |
| 2008/0065176 A1 | 3/2008 | Zhang et al. | | |
| 2008/0213915 A1 | 9/2008 | Durack et al. | | |
| 2009/0051926 A1 | 2/2009 | Chen | | |
| 2010/0277580 A1 | 11/2010 | Stallinga et al. | | |
| 2011/0068279 A1 | 3/2011 | Fay | | |
| 2012/0154759 A1 * | 6/2012 | Jorgensen | ....................... | 353/31 |

OTHER PUBLICATIONS

International Search Report and Written Opinion date mailed Aug. 7, 2012; PCT International Patent Application No. PCT/US2012/041767.

(Continued)

*Primary Examiner* — Roy M Punnoose
(74) *Attorney, Agent, or Firm* — Simpson & Simpson, PLLC

(57) ABSTRACT

A system and method for a hyperspectral illuminator. The hyperspectral illuminator includes an LED array for generating light of a predefined spectra. The hyperspectral illuminator further includes multiple collimators. Each of the multiple collimators is associated with one an LED of the LED array and focus the light into beams. The hyperspectral illuminator further includes multiple dichroic filters. The dichroic filters filter the beams. The hyperspectral illuminator further includes one or more integrator lenses for mixing the filtered beams into a uniform pattern for projection on to a target.

20 Claims, 14 Drawing Sheets

(56) References Cited

OTHER PUBLICATIONS

International Search Report and Written Opinion date mailed Oct. 17, 2012; PCT International Patent Application No. PCT/US2012/040612.

Kliner, et al., Development of Fiber-Laser-Based Laser-Induced Fluorescence for Detection of $SO_2$, Dec. 1998 [retrieved on Sep. 27, 2012]. Retrieved from the Internet: URL:http://www.osti.gov/bridge/servlets/purl/751016-jyJOwN/webviewable/751016.pdf p. 7, para [0003].

* cited by examiner

SYSTEM AND METHOD FOR HYPERSPECTRAL ILLUMINATION

CROSS REFERENCE TO RELATED APPLICATIONS

This application is a claims priority from the following U.S. Provisional Patent Applications 61/492,139 filed on Jun. 1, 2011, and 61/494,717 filed Jun. 8, 2011; the entire teachings of which are incorporated herein by reference.

BACKGROUND

Hyperspectral illumination may be utilized to perform real-time or near real-time assessment and monitoring of objects, such as physiological parameters of organic objects including humans and human tissues. Hyperspectral illumination may require light sources that can be turned on and off quickly. These light sources may illuminate an area or object with the reflected light being analyzed to attempt to detect chemical signatures.

Many hyperspectral imaging illumination systems use an array of light modulators and spectrometers. The light may be focused using a light guide or fiber optics. The existing systems are typically very large, complex, expensive, provide insufficient output, and are inefficient. For example, some systems utilize a 500 W Xenon lamp and only produce limited milliwatts of light output.

SUMMARY

One embodiment includes a system, method, imaging, system, and hyperspectral illuminator. The hyperspectral illuminator may include an LED array for generating light of a predefined spectrum. The hyperspectral illuminator may further include multiple collimators. Each of the multiple collimators may be associated with one an LED of the LED array and focus the light into beams. The hyperspectral illuminator may further include multiple dichroic filters. The dichroic filters filter the beams. The hyperspectral illuminator may further include one or more integrator lenses for mixing the filtered beams into a uniform pattern for projection on to a target.

Another embodiment provides a method for hyperspectral illumination. Multiple LEDs may be activated in synchronization with a camera to generate light. The light from each of the LEDs may be collimated into beams. The beams may be filtered utilizing dichroic filters corresponding to each of the LEDs to narrow band wavelengths to generate filtered beams. The filtered beams are mixed to generate a uniform pattern. A target is illuminated utilizing the uniform pattern.

Ye another embodiment provides an imaging system. The imaging system may include a hyperspectral illuminator configured to illuminate a target utilizing multiple spectra. The imaging system may further include a camera in communication with the hyperspectral illuminator and configured to capture one or more images for each of the multiple spectra. The imaging system may also include a data processing system controlling the hyperspectral illuminator and the camera. The data processing system may process data captured by the camera. The data processing system may further synchronize illumination of the target a number of times with image capture being performed by the camera each of the number of times.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

The illustrative embodiments provide a hyperspectral illuminator and system and method for hyperspectral illumination. In one embodiment, the systems and methods described may be utilized to analyze an object, such as biological tissue and samples (i.e. human, animal, etc). Light absorption, reflection, contrast, and other interactions of light with the object may be analyzed by an imaging device, such as a video camera to perform analysis of the tissue. In particular, the light-absorbing or characteristics of the tissue may be analyzed to distinguish between different tissues types (i.e. healthy, diseased, stained, damaged tissue, etc).

Figure 1:
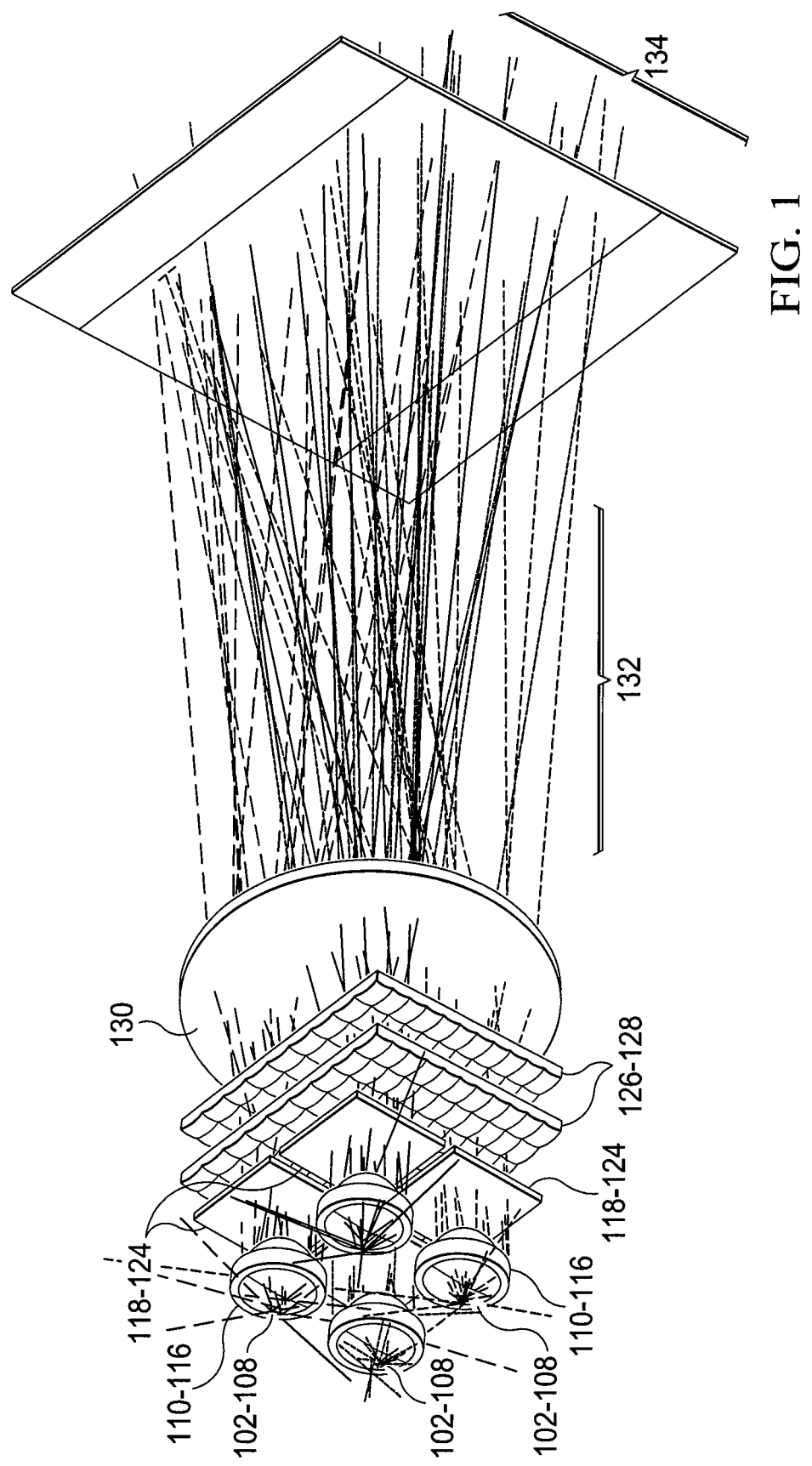
FIGS. 1-3 are a pictorial representation of a hyperspectral illuminator in accordance with an illustrative embodiment.
Figure 2:
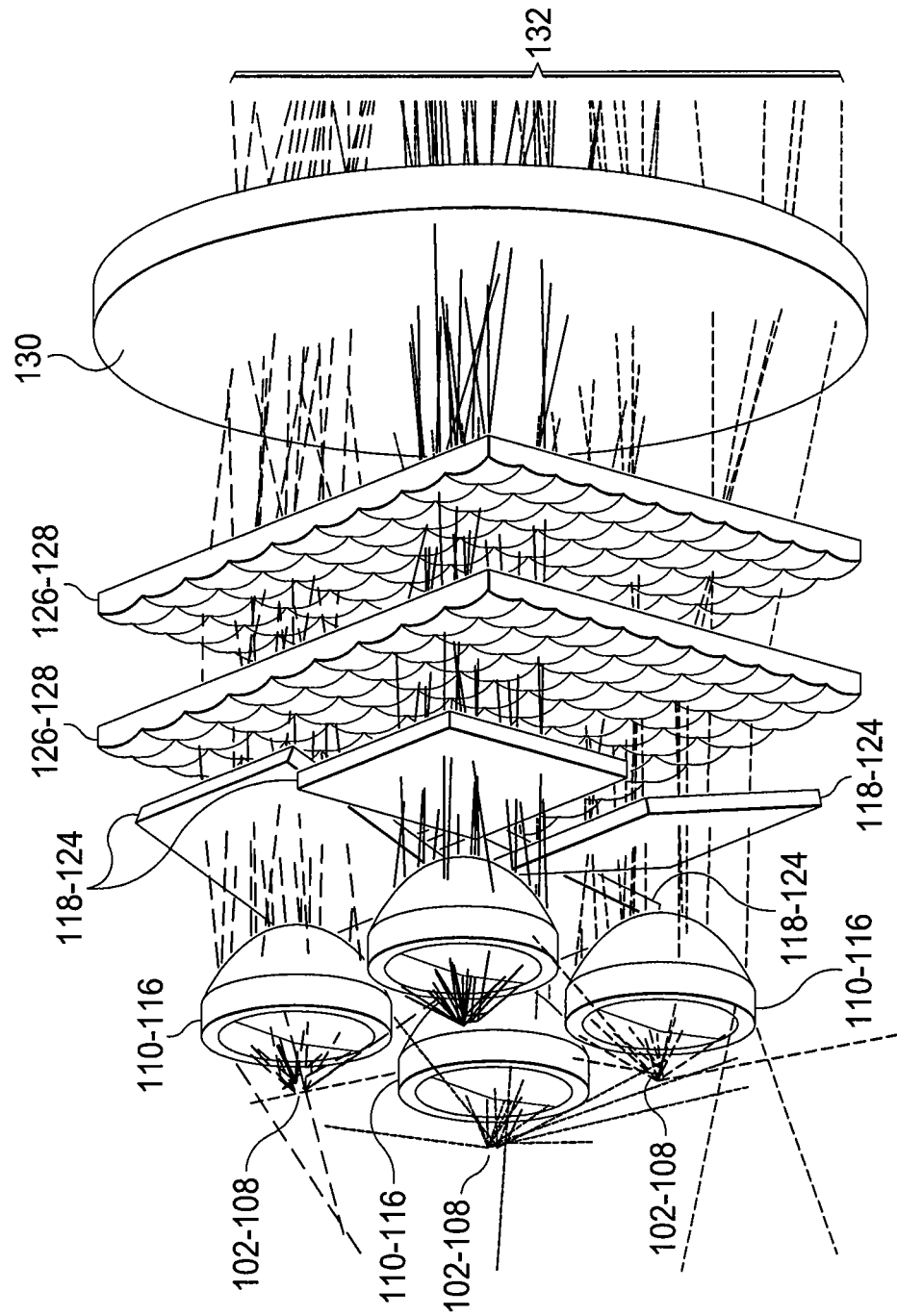
Figure 3:
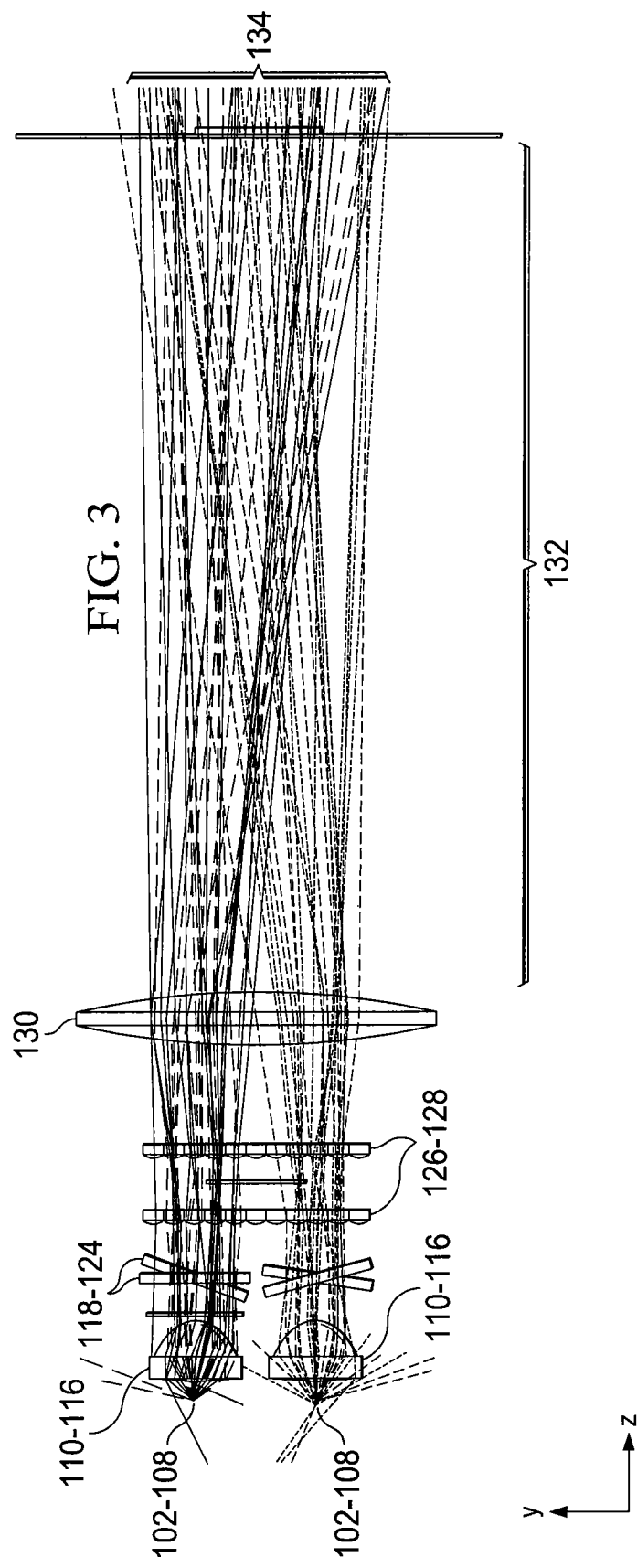

FIGS. 1-3 are pictorial representations of a hyperspectral illuminator 100 in accordance with an illustrative embodiment. FIG. 1 illustrates portions of the hyperspectral illuminator 100. The hyperspectral illuminator 100 may utilized with an imaging system to perform hyperspectral imaging across a number of spectra. In one embodiment, the hyperspectral illuminator 100 may include LEDs 102, 104, 106, and 108, collimators 110, 112, 114, and 116, dichroic filters 118, 120, 122, and 124, integrator lenses 126 and 128, focus lens 130, illumination 132, illumination field 134, object 136. The components of FIG. 1 may describe illumination optics of a system. The overall system may include an illumination module including the illumination optics as well as an imaging, control, process, and data output module and/or components. A hyperspectral imaging system (i.e. the hyperspectral illuminator 100, focal plane array detector, and managing software and chemometrics, such as those shown in FIG. 14) may be integrated with other systems, such as robotic systems, endoscopes, and surgical microscopes.

The LEDs 102, 104, 106, and 108 may generate light at different colors and frequencies. In one embodiment, the LEDs 102, 104, 106, and 108 may be an LED array. The LED array may include potentially hundreds or thousands of LEDs. For example, a larger LED array (e.g. FIG. 4) along with an imaging system and managing software and chemometrics may be utilized for operating room conditions and may even be utilised to visualize all or a portion of a patient at one time. The colors and frequencies of the LEDs 102, 104, 106, and 108 may correspond to the types of analysis that need to be performed on the object 136, which may be a tissue or organic site or sample.

In one embodiment, the hyperspectral illuminator 100 is a multimodal imaging system that performs hyperspectral imaging including imaging chromophores, fluorescence (e.g. ICG), wound topography and volume, structured light and cross polarization for seeing into tissue (i.e. vein and lymph viewing). The hyperspectral illuminator 100 may also include a switch (not shown) for switching between modalities, such as imaging fluorescence (ICG) and HSI chromophores inherent to the tissue or injected. For example, the hyperspectral illuminator 100 and imaging system may be utilized for plastic and general surgery applications and analysis, such as skin flaps, mastectomy skin analysis, and necrosis examinations. The systems described in the embodiments may also be utilized to determine wound depth and volume, wound healing, treatment effectiveness, vein imaging, vascular clot visualization, lymph node visualization, flaps, and stitching tension to name a view potential uses.

The hyperspectral illuminator 100 may be utilized to perform imaging including spectral illumination visualizing predetermined tissue chemistry, fluorescence, or full spectral scans collecting a spectrum at each image pixel to generate a hyperspectral image data cube. For example, the hyperspectral illuminator 100 and imaging system may utilize pattern recognition to distinguish healthy tissue from unhealthy tissue and to distinguish organs. In one embodiment, the spectral illuminations cover the wavelengths ranging from 500-650 nm. However, the range is not limited and may be selected in response to chemistry and spectroscopy to be visualized which may cover the ultraviolet to infrared and beyond. Any spectrum may be utilized to visualize the location and quantity of a target chemistry. For example, the LEDs may produce light at different wavelengths of the visible spectrum. Some of the LEDs may also produce white light that remains unfiltered. In one embodiment, the LEDs 102, 104, 106, and 108 may generate wavelengths varying from visible light to near infrared light or signals (and any combination thereof).

The collimators 110, 112, 114, and 116 assist in capturing and aligning the light emitted by each of the LEDs 102, 104, 106, and 108 in a narrow beam. The hyperspectral illuminator 100 includes dichroic filters 118, 120, 122, and 124 for each narrow band wavelength. In one embodiment the dichroic filters 118, 120, 122, and 124 may be arranged in an array corresponding to the LED array. The dichroic filters 118, 120, 122, and 124 are tilted at a different angle so that the band pass may be tuned for each of the LEDs 102, 104, 106, and 108. In one example, the dichroic filters 118, 120, 122, and 124 may have a range or band of 10 nm. Where four bands are required for a particular type of illumination, four LEDs and filters may be used. In another embodiment, the dichroic filters 118, 120, 122, and 124 may be custom filters that transmit two bands and as a result only one LED may be required for multiple bands. As a result, the number of LEDs or other light sources may be further reduced.

The angling of the dichroic filters 118, 120, 122, and 124 is further illustrated in FIGS. 2 and 3. The angles of the dichroic filters 118, 120, 122, and 124 may be static or variable based on the required application. In one embodiment, the angles of the dichroic filters 118, 120, 122, and 124 are set by default and may be adjusted or calibrated as needed utilizing setting and tuning components known in the art. In another embodiment, the dichroic filters 118, 120, 122, and 124 may be dynamically adjusted utilizing motors or other movable settings based on a feedback loop to tune the filter characteristics. For example, a small spectrometer may sample one or more light beams output in the illumination 132 or at other points in the hyperspectral illuminator 100. The dichroic filters 118, 120, 122 and 124 may then be adjusted so that the light beams are tuned to the required wavelengths.

The dichroic filters 118, 120, 122 and 124 further limit the light to a specific range of frequencies while reflecting the other frequencies and colors. In addition, each of the dichroic filters 118, 120, 122, and 124 may be tilted to a different angle so that the band pass may be tuned for each of the LEDs 102, 104, 106, and 108. For example, the dichroic filters 118, 120, 122 and 124 may be angularly adjusted to allow a filter designed for 600 nm to be tuned to 592 nm based on the angle-tuning properties of the dichroic coatings. In another embodiment, the hyperspectral illuminator may not require the dichroic filters 118, 120, 122 and 124 because the LEDs 102, 104, 106, and 108 produce wavelengths in specific bands required for illumination.

The integrator lenses 110 and 116 further make the filtered light more uniform. The focus lens 130 focuses the illumination 132 or output light on the illumination field 134 of the object 136. The focus lens 130 may also be utilized to configure or adjust the size of the illumination field 134. In one example the focus lens 130 may be a zoom lens adjusting the size of the illumination field 134. In one embodiment the illumination field 134 may be a two feet square for visualizing all or a portion of the abdomen and chest (with a 2-3 ft separation between the hyperspectral illuminator 100 and the tissue). For example, surgical applications may require at least 24" to be outside the minimum sterile area or dome without requiring the hyperspectral illuminator 100 be sterilized. In another embodiment, the illumination field 134 may be adjusted to view pressure ulcers or skin flaps from two to six inches squared.

The hyperspectral illuminator 100 may further include an imaging device or detector for analyzing and/or processing the interaction of the illumination field 134 with the object 136. The interactions may include reflection, absorption, fluorescence, and contrast. The hyperspectral illuminator 100 is particularly useful because the size and cost is reduced when compared with other light sources, such as an Agile Light Source (e.g. OL490). In addition, computation may be simplified by having uniform light distribution over the targeted material and selected area. The hyperspectral illuminator 100 may allow only specific wavelengths of light absorbed by the subject to illuminate the subject enhancing the signal-to-noise ratio. The hyperspectral illuminator is reduced in size because it does not require a DLP, gratings, or the associated optics. For example, the hyperspectral illuminator 100 may be a fraction of the size of the OL490 Agile Light Source while still being more than eight times as bright.

Figure 4:
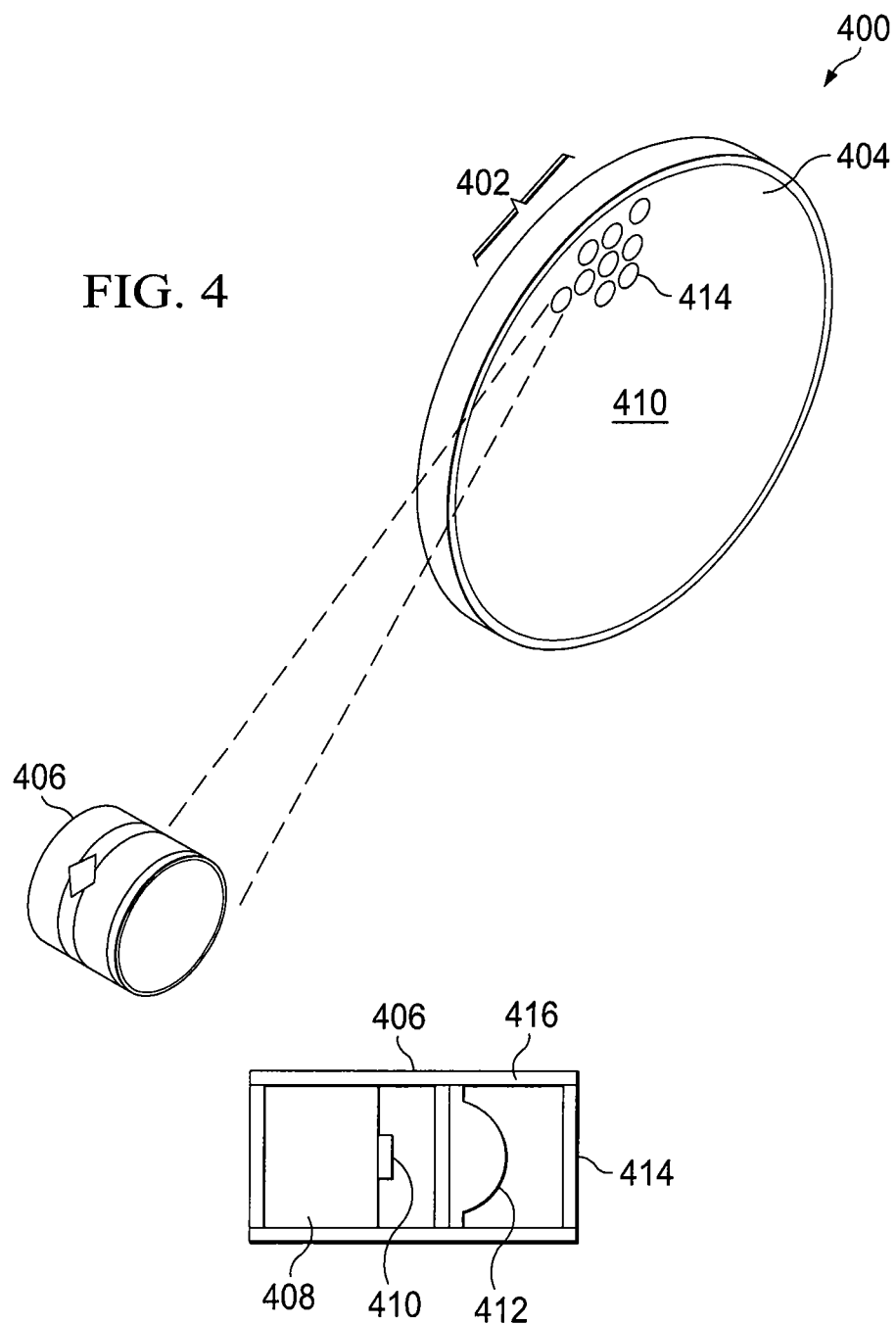
FIG. 4 is a pictorial representation of a hyperspectral illuminator 400 in accordance with an illustrative embodiment.

FIG. 4 is a pictorial representation of a hyperspectral illuminator 400 in accordance with an illustrative embodiment. The hyperspectral illuminator 400 is one embodiment that may be utilized in an operating room light for performing hyperspectral imaging when coupled with an imaging camera, managing software, and chemometrics. As shown, the hyperspectral illuminator 400 may include an LED array 402. The LED array 402 may be embedded or integrated in a frame 404. In one embodiment, individual LEDs of the hyperspectral illuminator may be removed, replaced, or reconfigured for different applications.

In one embodiment, each of the LEDs of the LED array 402 may be color coordinated or otherwise marked indicating a specified wavelength. As a result, the LED array 402 may be more easily configured for specified types of testing.

Each of the LEDs within the LED array 402 may be composed of individual units, such as LED unit 406. The LED unit 406 may include a heat sink 408, LED 410, collimator 412, and dichroic filter 414. The components of the LED unit 406 may be enclosed in a case 416. In one embodiment, the hyper spectral illuminator 400 is an integrated portion of an overhead light, such as a surgical light.

Figure 5:
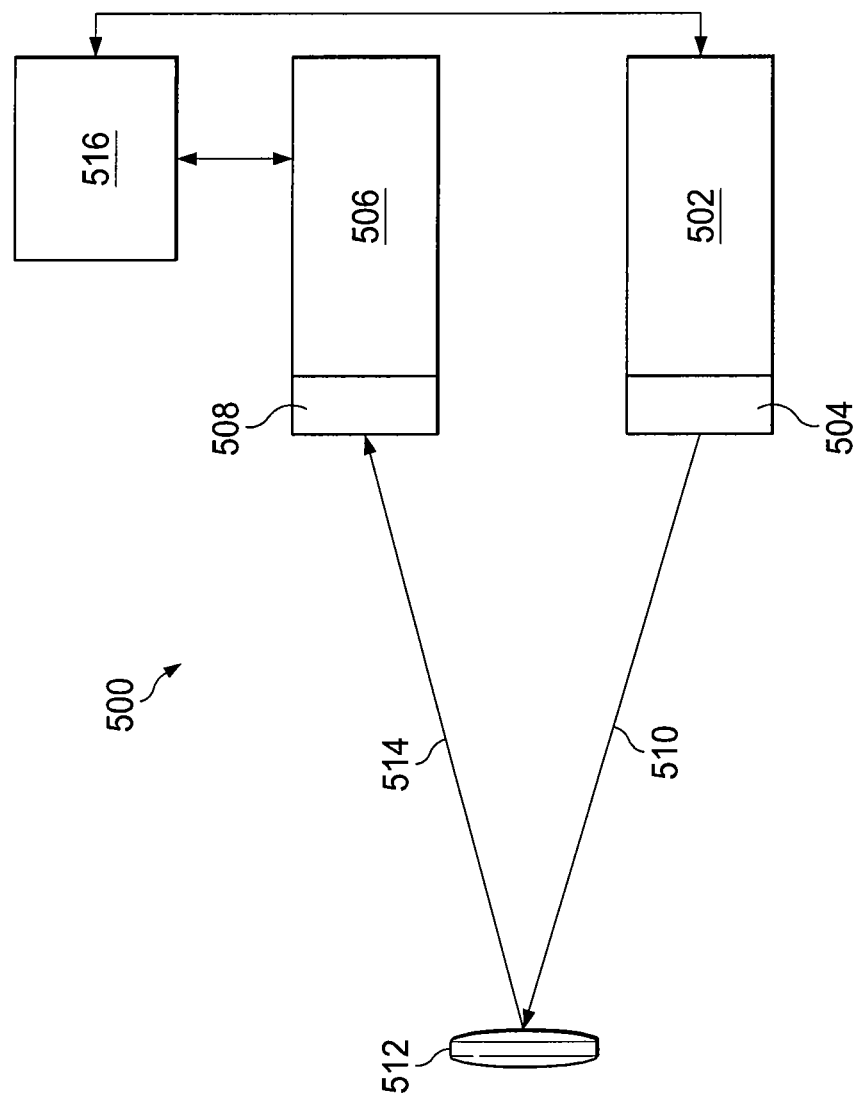
FIG. 5 is a block diagram of an imaging system 500 in accordance with an illustrative embodiment.

FIG. 5 is a block diagram of an imaging system 500 in accordance with an illustrative embodiment. The imaging system 500 may include a hyperspectral illuminator 502 including a source circular polarizer 504 and a detector 506 that may include a detector circular polarizer 508. The hyperspectral illuminator 502 or source may output linearly polarized light 510 that is reflected off of tissue 512 as un-polarized light 514.

The source circular polarizer 504 linearly polarizes the output light (parallel or 0° with respect to the hyperspectral illuminator 502) passed to the tissue 512 as linearly polarized light 508. In one embodiment, the detector circular polarizer 508 may have a plane of polarization of approximately 45-50° relative to the source circular polarizer 504 to reduce glare. The light that passes through the detector circular polarizer 508 is then passed to the detector 506 for processing and additional analysis. The source circular polarizer 504 and detector circular polarizer 508 may include threads for attachment to the hyperspectral illuminator 502 and the detector 506. Cross polarization provides an improved image and the ability to see further into the tissue. The detector 506 may be any number of systems including a focal plane array, such as CCD, and CMOS that is typically utilized in video cameras, cameras, web cams, or imaging devices known in the art. The detector 506 may also include any number of custom or off the counter lenses, such as 50 or 60 mm Nikon lenses.

In one embodiment, the imaging system 500 may determine tissue oxygenation. For example, a threshold of approximately 60-62% HbO2 may provide information regarding incision points, viable tissue, delayed healing, or potential necrosis. For example for skin flaps a threshold below 62% has been associated with post operative necrosis and increased recovery times and hence a risk factor predicting the possibility of post operative necrosis. The imaging system 500 may utilize any number of thresholds or alerts to indicate to a user that the threshold is exceeded. A surgeon may utilize real-time images to plot gradients, make marks, or make incisions. In one embodiment, the imaging system 500 may utilize a variable exposure time. For example, with a 3-shot method a ratio of 3.87:1.95:1, but not limited to such a ratio may be utilized. The combination of illumination intensity provided by source along with exposure time of the detector as the detector varies from one illumination to the other. The imaging system 500 may also compensate or correct for optical effects or medical conditions, such as melanin or curvature. For example, compensation may be performed by varying the chemometric threshold that compensates for melanin levels and structured lighting for curvature.

The imaging system 500 may further include processing unit 516 (a data processing system) utilized to process the images, video, or data acquired by the detector 506. In one embodiment, the processing unit 516 may be a laptop, desktop computer, PDA, smart phone or other device that processes the data for display to a user or a custom circuit board or be a field programmable gate array. The processing unit 516 may be further utilized to control the hyperspectral illuminator 502 for illuminating the tissue 512. The processing unit 516 may utilize any number of graphical user interfaces to receive control commands, instructions, and information. The processing unit 516 may also be utilized to compensate for reflectance issues and problems from the complex spectral light reflected off of the tissue 512 the processing unit 516 may process and display chemically encoded images at or near video rates. The processing unit 516 may utilize software or firmware for performing the processing and displaying. The processing unit 516 may also utilize chemometric algorithms to ensure that the tissue 512 is properly illuminated and the reflected light is properly analyzed for displaying tissue chemistry quantitatively. In other embodiments, the processing unit 516 may be an application specific integrated circuit, field programmable gate array, or other enhanced processing unit.

Turning now to FIGS. 6-12, FIG. 6 is a pictorial representation of a hyperspectral illuminator 600 in accordance with another illustrative embodiment. The hyperspectral illuminator 600 may be similar to the embodiment shown in FIGS. 1-3. The hyperspectral illuminator 600 may be configured and packaged for utilization in any number of surgical, clinical, research, or other settings. One embodiment, the hyperspectral illuminator 600 may include a number of LEDs and filters to produce at least a first and illumination spectrum, a second illumination spectrum and a third illumination spectrum.

Figure 7:
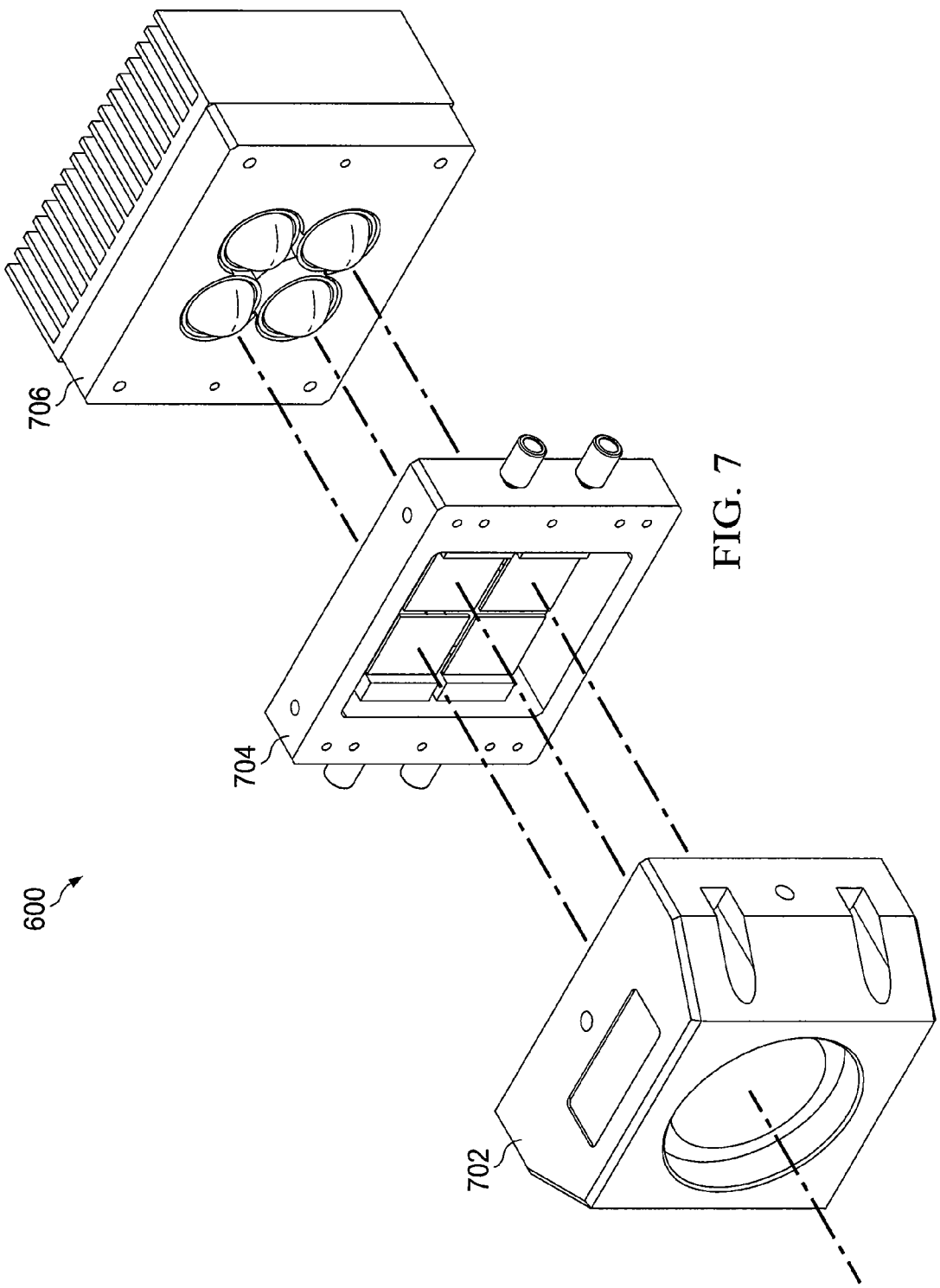
FIG. 7 is an exploded view of the hyperspectral illuminator 600 of FIG. 6.

The hyperspectral illuminator 600 may be composed of a number of components or modules as is shown in the exploded view of FIG. 7. In one embodiment, the hyperspectral illuminator 600 may include a projection optics module 702, a dichroic module 704, and an illumination module 706. The modules of the hyperspectral illuminator 600 may be connected, integrated, or attached utilizing any number of attachment devices or securing mechanisms. For example, buckles, pins, set screws or other connectors may be utilized to both align and secure the modules of the hyperspectral illuminator 600 to one another.

In one embodiment, the hyperspectral illuminator 600 may be enclosed in a portable and small framework, similar to a mini to large flashlight. The hyperspectral illuminator 600 may also be configured to include the detector/camera and other processing components for a mobile embodiment. The hyperspectral illuminator 600 may also be embodied in an endoscope. The hyperspectral illuminator 600 may include a battery (not shown) or other power connection for powering a portable embodiment.

In another embodiment, the hyperspectral illuminator 600 may be entirely encompassed within an application specific integrated circuit (ASIC), fully programmable gate array (FPGA) with illumination functionality (e.g. programmable LEDs), or other similar circuit.

Figure 6:
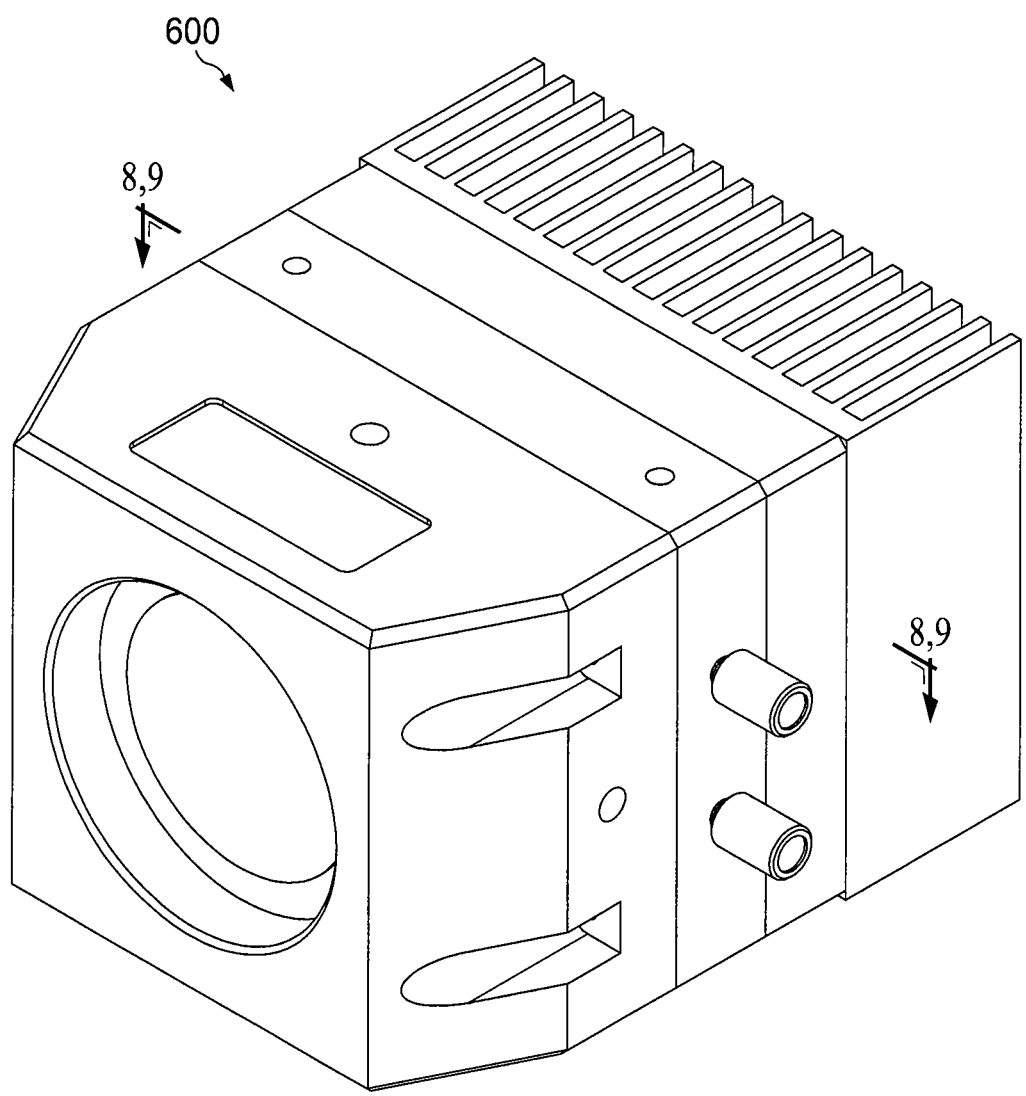
FIG. 6 is a pictorial representation of a hyperspectral illuminator 600 in accordance with another illustrative embodiment.
Figure 8:
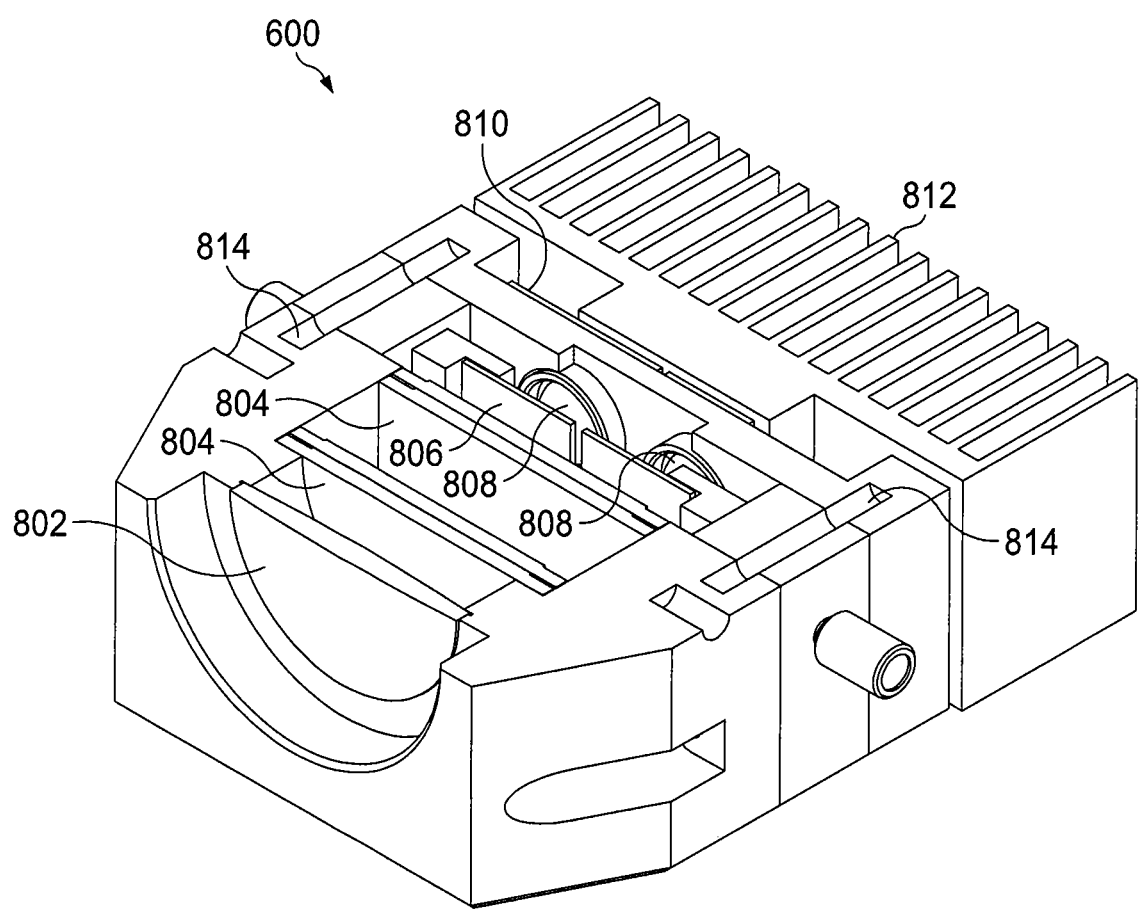
FIG. 8-9 are cut-away views of the hyperspectral illuminator 600 of FIG. 6.
Figure 9:
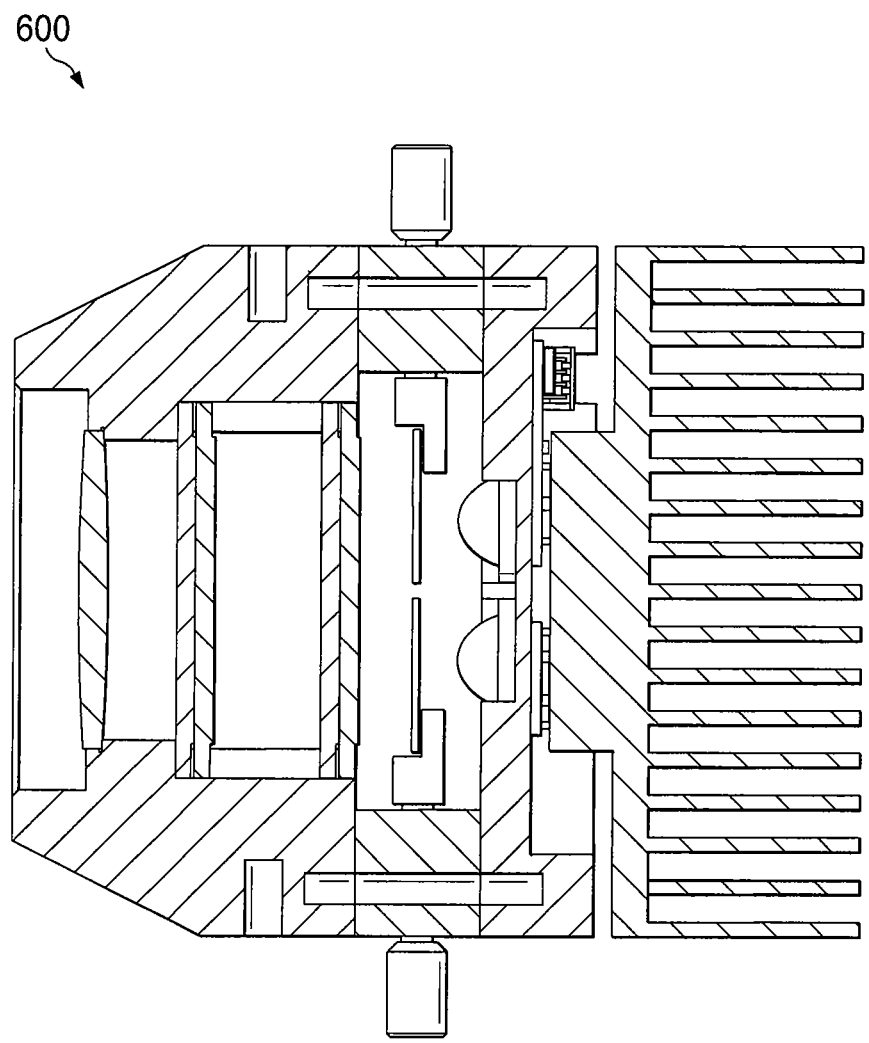

FIGS. 8-9 are a cut-away view of the hyperspectral illuminator 600 of FIG. 6. The hyperspectral illuminator 600 may include a first lens 802, fly eye lenses 804, dichroic filters 806, collimator lenses 808, LED printed circuit boards (PCR) 810, a heat sink 812, and alignment holes 814. In addition, the hyperspectral illuminator 600 may include any number of retainer rings, spacers, and other securing and separating components not specifically called out. For example a retainer ring may keep the first lens 802 in position and a fly eye spacer (not shown) may separate the fly eye lenses 804. The hyperspectral illuminator 600 may also include threading for screwing in a circular polarizer as previously described.

Figure 10:
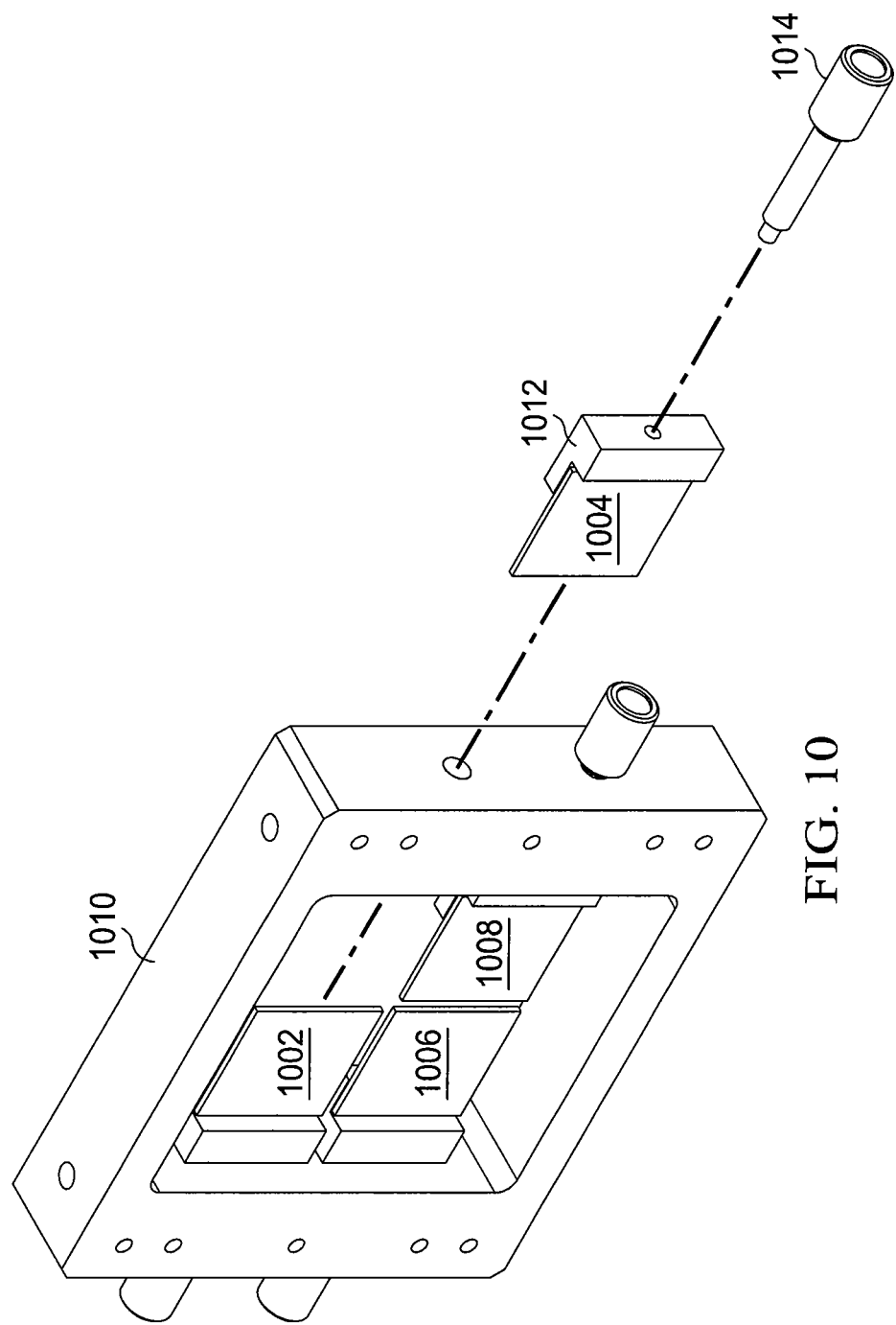
FIG. 10 is a pictorial representation of a dichroic module in accordance with an illustrative embodiment.

FIG. 10 is a pictorial representation of a dichroic module 1000 of the hyperspectral illuminator of FIG. 6. The dichroic module 1000 may include a number of dichroic filters. In one embodiment, the dichroic module 1000 includes four dichroic filters 1002, 1004, 1006, and 1008. As illustrated a system chassis 1010 may house the dichroic filters 1002, 1004, 1006, and 1008. In one embodiment uniformly applicable, the dichroic lens 1004 may be secured by a mount 1012. The position of the dichroic filter 1004 and mount 1012 may be adjusted by a connected pivot knob 1014. One or more set screws 1016 may fix the position, tilt and angle of the dichroic filter 1004 and mount 1012 when positioned in the system chassis 1010. The system chassis 1010 includes a number of holes for fixing each of the dichroic filters 1002, 1004, 1006, and 1008.

Figure 11:
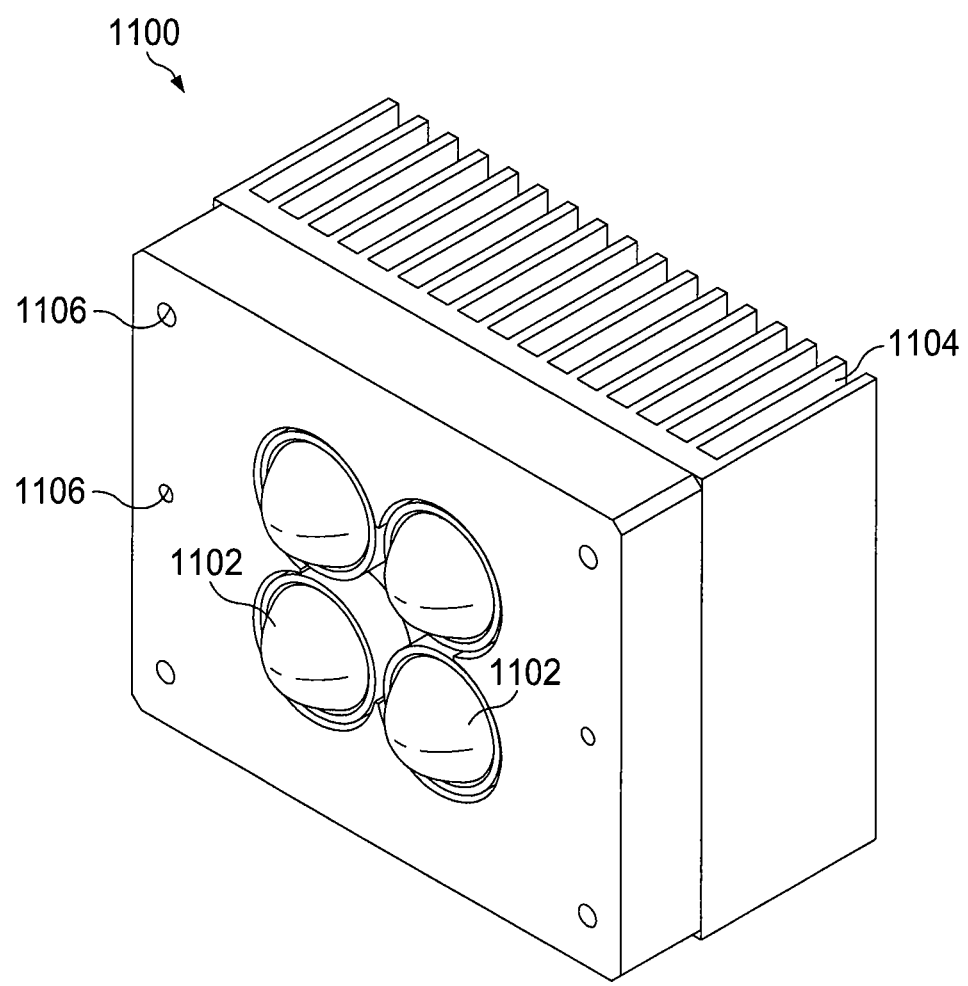
FIG. 11 is a pictorial representation of an illumination module in accordance with illustrative embodiment.

FIG. 11 is a pictorial representation of an illumination module 1100 in accordance with illustrative embodiment. The illumination module 1100 may include an LED array 1102, a heat sink 1104, and mounting holes 1106. As previously described, the LED array 1102 may include any number of LEDs positioned in any number of configurations. The heat sink 1104 may be utilized to cool the hyperspectral imager during usage and may include any number of passive or active cooling systems, such as fans, fans, liquid cooling, and so forth.

The mounting holes 1106 may be utilized to attached the components of the illumination module 1100 or two attached the illumination module to the other modules of the hyperspectral illuminator.

Figure 12:
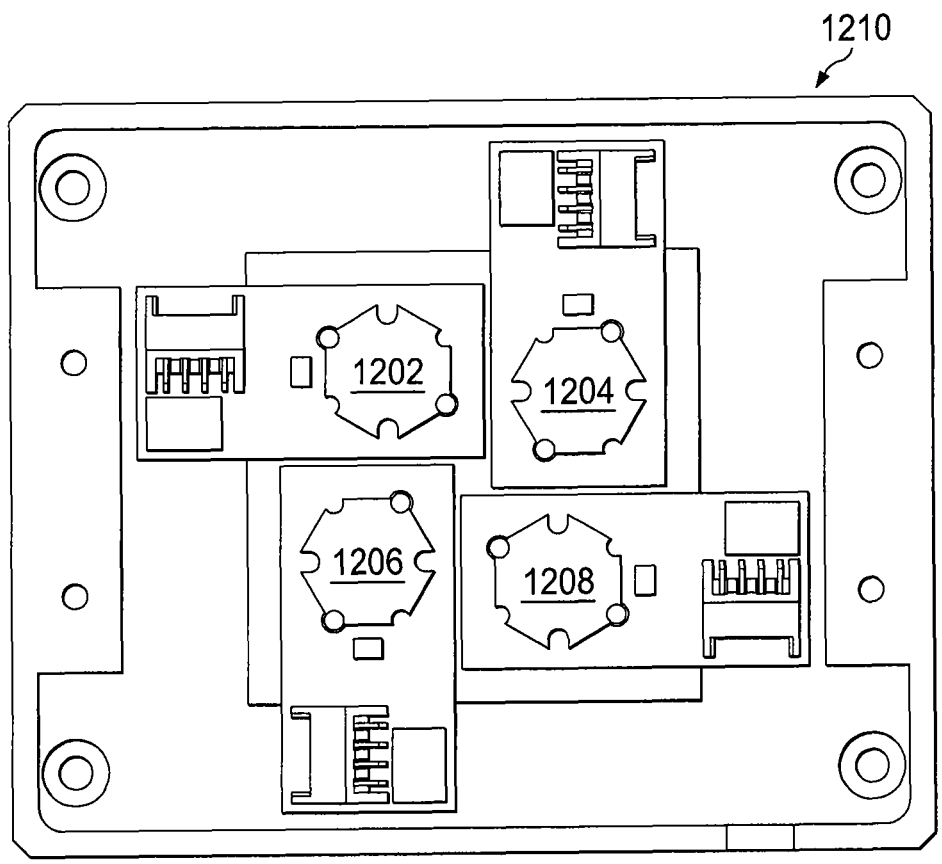
FIG. 12 is a pictorial representation of the LED printed circuit boards in accordance with an illustrative embodiment.

FIG. 12 is a pictorial representation of the LED printed circuit boards 1202, 1204, 1206, and 1208 in accordance with an illustrative embodiment. As the included embodiment, each of the printed circuit boards 1202, 1204, 1206, and 1208 is a separate component. As a result, the printed circuit boards may be more easily replaced for maintenance or repair or reconfigured to provide specified wavelengths.

The LED printed circuit boards 1202, 1204, 1206, and 1208 may be connected to a chassis 1210. The collimators (not shown) may be attached to the other side of the chassis 1210 corresponding to each of the LEDs mounted in the LED printed circuit boards 1202, 1204, 1206, and 1208. In another embodiment, the printed circuit boards 1202, 1204, 1206, and 1208 or the respective heat sinks may be integrated in a single printed circuit board. A single printed circuit board may share power and control components, such as buses, ports, interfaces, or so forth. In another embodiment, the printed circuit board may also include a processor and a memory for storing instructions utilized to control the hyperspectral illuminator.

Figure 13:
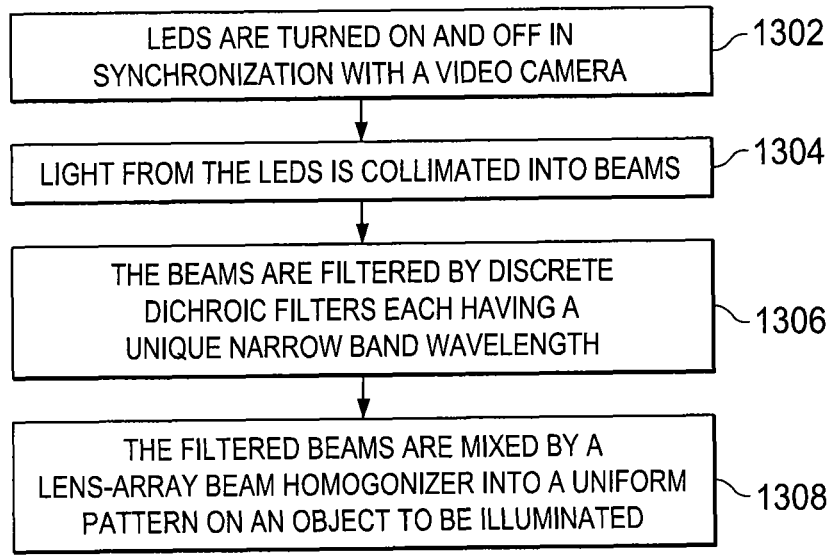
FIG. 13 is a flowchart of a process for hyperspectral illumination in accordance with an illustrative embodiment.

FIG. 13 is a flowchart of a process for hyperspectral illumination in accordance with an illustrative embodiment. The process of FIG. 13 may be implemented by a hyperspectral illuminator. The process may begin with multiple LEDs being turned on and off in synchronization with a video camera (step 1302). The number and color of the LEDs may be selected in response to the target material being analyzed and imaged. Any number of switching components may be utilized to control the operation of the LEDs. In one embodiment, a control module triggers the LEDs and control the camera imaging and data collection as required. The control module may also control the processing of the data utilizing pipeline processing. For example the LEDs are triggered to illuminate using ill1 and then the camera is triggered to capture the reflectance image of ill1 followed by ill2 and ill3, which are then digitized and all three are processed accordingly. In another embodiment, only one new illumination is collected and digitized, and then processed using the previous two illuminations for determining the chemically encoded image. Another embodiment may include synchronizing the hardware trigger and using a parallel processing thread to process the collected digitized images in parallel for triggering the hardware in synchrony and digitization.

Next, light from the LEDs is collimated into beams (step 1304). The beams are filtered by discrete dichroic filters each having a unique narrow band wavelength (step 406). The frequency of the light is determined by the selection of dichroic filters.

Next, the filtered beams are mixed by a lens-array beam homogenizer into a uniform pattern on an object to be illuminated (step 1308). In one embodiment, the lens-array beam homogenizer is one or more integrator lenses. The lens-array may also be a fly eye lenses for projecting the filtered beams uniformly (e.g. intensity and color). The beams may also be passed through a focus lens to focus the beams to define the illumination field. The output light of the illumination spot or field may configured to emit any number of shapes including round, hexagonal, square, rectangular, and so forth. A zoom system may be utilized to vary the size of the illumination spot.

Figure 14:
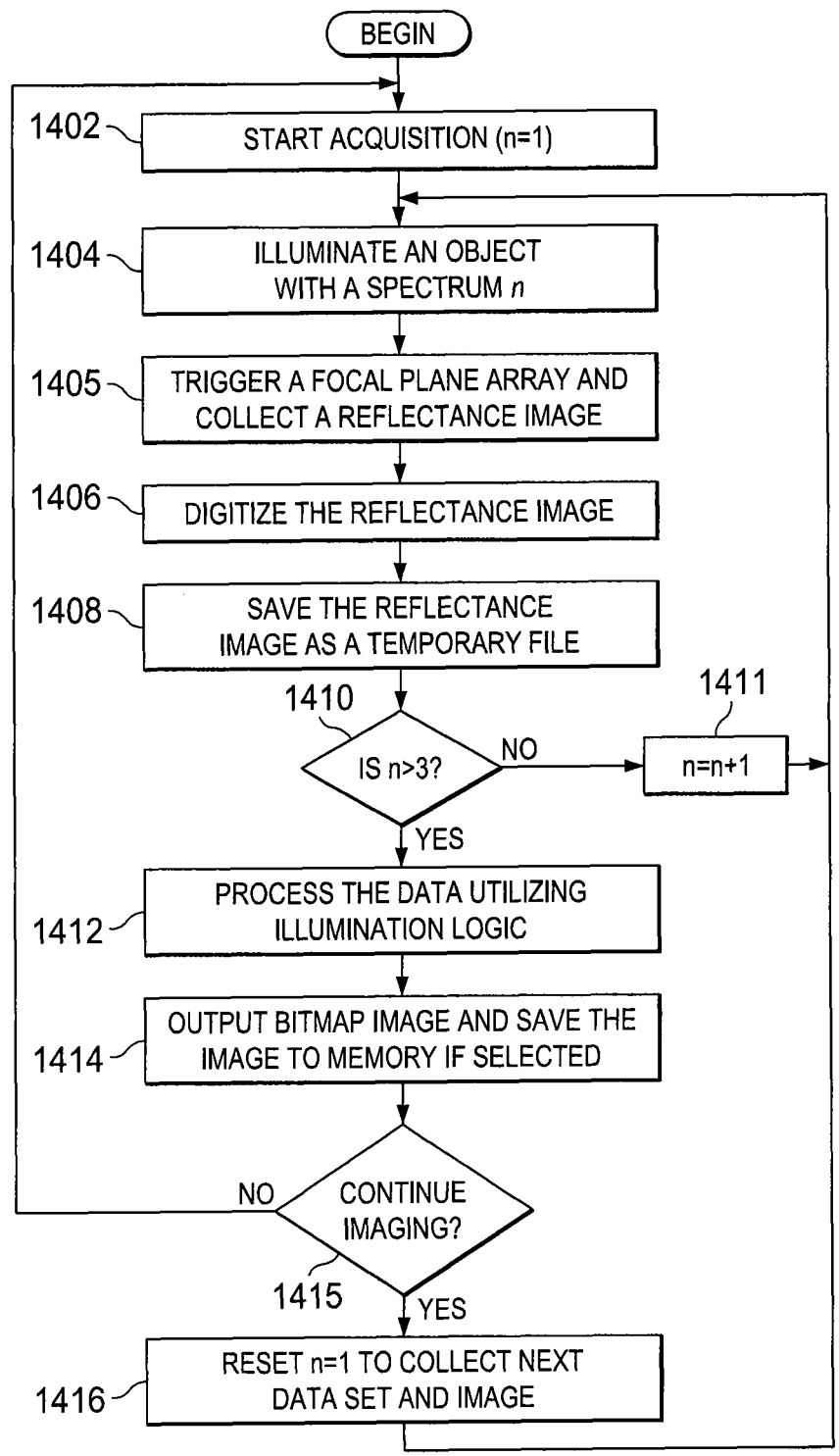
FIG. 14 is a flowchart of a process for multiple illuminations in accordance with an illustrative embodiment.

FIG. 14 is a flowchart of a process for multiple illuminations in accordance with an illustrative embodiment. The process of FIG. 14 may be implemented by a hyperspectral imaging system as described in the illustrative embodiments. The process may begin with the system starting acquisition with n=1 (step 1402). In one embodiment, the user may select to begin acquisition utilizing a graphical user interface displayed by the system. For example, the user may be a doctor that is examining a skin flap of a patient and has turned on or otherwise activated the system. In another embodiment, acquisition may begin automatically in response to detecting that an object, such as tissue or an appendage has been positioned within the field of view.

Next, the system eliminates an object with a spectrum n (step 1404). In one embodiment, the system may activate a hyperspectral illuminator or LED head to illuminate the object. The spectrum may be selected automatically utilizing a defined process. In another embodiment, the user may set the spectrum for each illumination (i.e. n=illumination 1, illumination 2, illumination 3).

Next, the system triggers a focal plane array and collects a reflectance image (step 1405). During step 1405 the focal plane array (FPA) may be triggered to collect a spectroscopic reflectance image (image/data capture). Step 1405-1408 may all be performed by a camera of an imaging system to open the shutter of the camera, detector, or array, expose the FPA, close the shutter, and perform analog-to-digital conversion. The system may utilize a variable exposure time to maximize the signal to noise ratio. For example, the ratio may be 3.87:1.95:1 relative to a three illumination cycle for ill1, ill2, and ill3 (or illall). However, any number of ratios may be utilized to reduce noise and enhance image quality.

Next, the system digitizes the reflectance image (step 1406). As noted, step 1406 may include analog-to-digital conversion by any number of devices or components of the image array.

Next, the system saves the reflectance image as a temporary file (step 1408). The data saved in the temporary file may be saved in the raw spectroscopic reflectance image array as well as the digitized or processed format for additional processing and analysis. For example, the data may be saved as temp00n.dat. The data may be temporarily saved to a RAM memory, and if selected, may also be streamed to a long-term memory (e.g. hard drive). During steps 1404-1408, the system may perform hardware synchronization to synchronize illumination, triggering, and data/sensor capture of the illumination and detection modules of the system.

Next, the system determines whether n is greater than 3 (step 1410). The illustrative embodiment is shown utilizing a three shot process. However, the system may utilize any number of illumination combinations to acquire the data and images necessary for the user. If n is not greater than 3, the system sets n equal to n+1 (step 1411) before returning to illuminate the object at the spectrum n (step 1404). By repeating step 1404, data may be acquired at different wavelengths in order to generate a composite image.

If n is determined to be greater than 3 in step 1410, the system processes the data utilizing illumination logic (step 1412). For example, the illumination logic may be an algorithm implemented as a script, program, or application. The system outputs a bitmap image and saves the image to memory selected (step 1414). During step 1414 the raw reflectance spectroscopic image array may also be saved to memory. Any number of image or output files or formats may be utilized. The image (final chemically encoded processed image and raw reflectance images ill1, ill2, and ill3) may also be saved to a temporary or long term memory or database in response to a user selection. The user selection may be received through the graphical user interface prior to starting or during the acquisition process of FIG. 14. During step 1414 the image may be displayed to one or more users in real-time or near real-time for utilization as is herein described. The data set acquired may be utilized to generate a hyperspectral image utilizing the different spectrums. The data sets may also be utilized to generate a hyperspectral image cube.

Next, the system determines whether to continue imaging (step 1415). The determination may be made based on user feedback or in response to an automatic decision. For example, the system may determine that a tissue sample has been thoroughly illuminated and imaged with all of the required or specified illumination spectra. If the system determines to stop imaging during step 1415, the process ends.

If the system determines to continue image during step 1416, the system resets n equal to one to collect the next data set an image (step 1416). After step 1416, the system may again return to step 1404 to start acquisition for determining the next chemically encoded image in time or use different processing methods. For example, only collecting ill1 and using the current ill1 with the previous ill2 and ill3 to determine the current chemically encoded image or utilizing a different set of spectra or wavelengths. For example, the spectrum associated with n may vary between data sets.

The process illustrated in FIG. 14 is not limited to collecting only three spectral images and performing processing. For example, a new n1 image may be acquired and the old or previous n2 and n2 images from the previous data set may be utilized to calculate and determine the chemically encoded image. The process of FIG. 14 may be utilized as management logic (hardware or software) for the real-time flow of data including: synchronizing hardware, collecting data, processing the data, and visualizing and storing the data.

Figure 15:
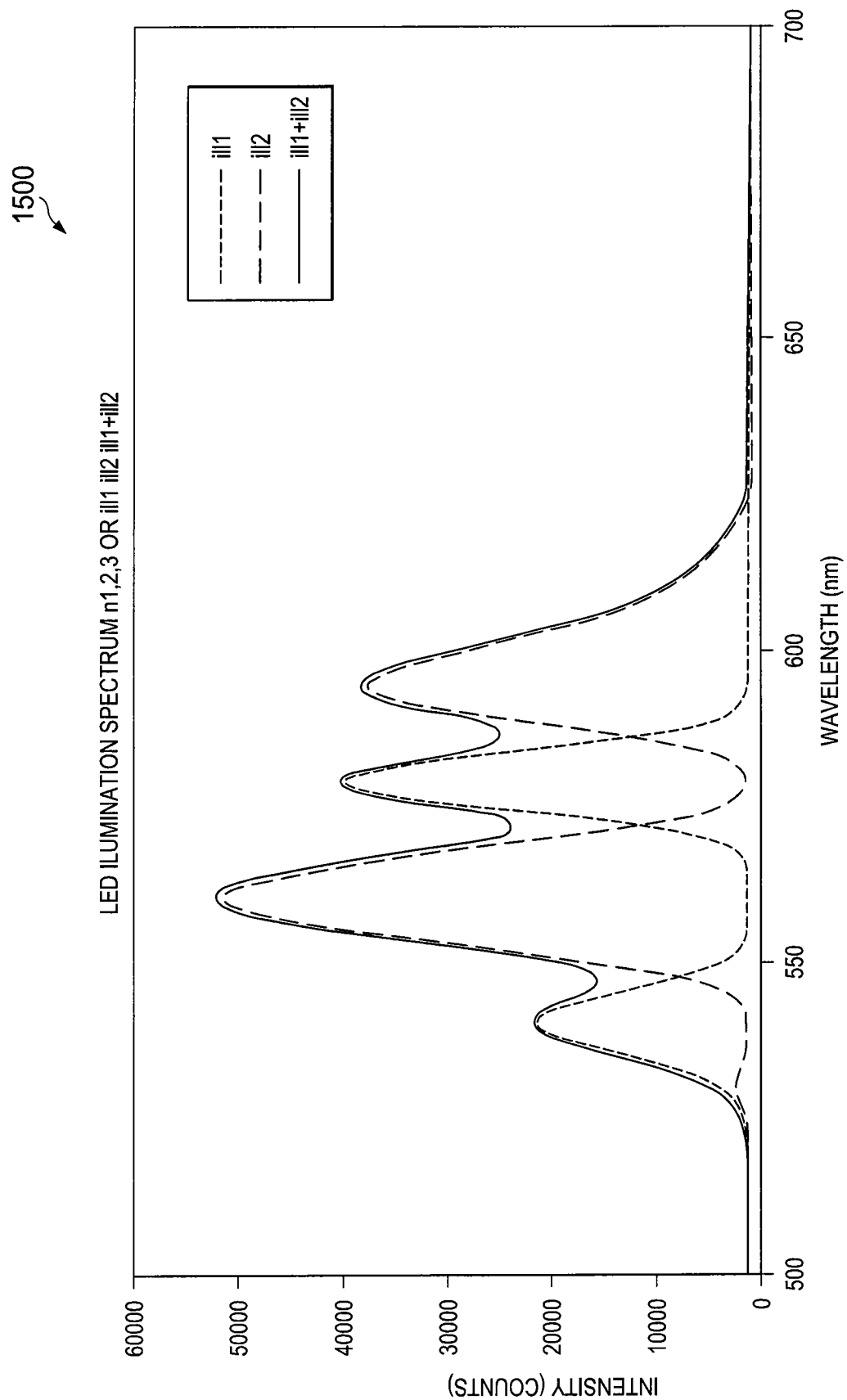
FIG. 15 is a representation of illumination spectra in accordance with an illustrative embodiment.

FIG. 15 is a representation of illumination spectrums 1500 in accordance with an illustrative embodiment. The illumination spectrums shown in FIG. 15 may correspond to those utilized in the process of FIG. 14. For example, n=1 may correspond to ill1, n=2 may correspond to ill2, and n=3 may correspond to ill3 (or ill1+ill2). In one embodiment, the first spectral illumination (ill1) is the positive spectral difference determined by subtracting the normalized parent absorbance spectrum of Hb from HbO2. The second illumination (ill2) subtracts HbO2 from Hb, and the third illumination (ill3) is a broadband spectrum of the source or all LEDs. The three complex spectroscopic illuminations reflected from the tissue or object are measured at each detector image pixel and processed by determining a difference image between the ratios of the first two reflected illuminations to the bright field image. The resulting chemical encoded images allow the user, such as a surgeon, to monitor changes in blood oxygenation perfusion. FIG. 15 illustrates spectra that may be utilized in one embodiment.

The previous detailed description is of a small number of embodiments for implementing the invention and is not intended to be limiting in scope. The following claims set forth a number of the embodiments of the invention disclosed with greater particularity.

What is claimed:

1. A hyperspectral illuminator, comprising:
   an LED array for generating light of a predefined spectra;
   a plurality of collimators, wherein each of the plurality of collimators is associated with an LED of the LED array and focuses the light into beams;
   a plurality of dichroic filters, wherein the dichroic filters filter the beams; and
   one or more integrator lenses for mixing the filtered beams into a uniform pattern for projection on to a target.

2. The hyperspectral illuminator according to claim 1, wherein the LED array is configured to produce at least three predefined spectra during a visualization process.

3. The hyperspectral illuminator according to claim 1, wherein the hyperspectral illuminator is encompassed in an overhead light.

4. The hyperspectral illuminator according to claim 1, wherein the integrator lenses are fly eye lenses.

5. The hyperspectral illuminator according to claim 1, wherein components of the hyperspectral illuminator are integrated within a printed circuit board or application specific integrated circuit.

6. The hyperspectral illuminator according to claim 1, wherein illumination of the target across a plurality of spectra is sequentially synchronized.

7. The hyperspectral illuminator according to claim 1, wherein the target is a tissue sample of a patient being visualized utilizing hyperspectral imaging.

8. The hyperspectral illuminator according to claim 1, wherein LEDs in the LED array are interchangeable to generate a plurality of spectra.

9. The hyperspectral illuminator according to claim 1 further comprising a polarizer disposed between the one or more integrator lenses and the target, wherein the uniform pattern is polarized prior to projection on to the target.

10. A method for hyperspectral illumination, the method comprising:
    activating a plurality of light emitting diodes (LEDs) in synchronization with a camera to generate light;
    collimating the light from each of the LEDs into beams;
    filtering the beams utilizing dichroic filters corresponding to each of the LEDs to narrow band wavelengths to generate filtered beams;
    mixing the filtered beams to generate a uniform pattern; and
    illuminating a target utilizing the uniform pattern.

11. The method according to claim 10, wherein the mixing is performed by a beam homogenizer.

12. The method according to claim 11, wherein the beam homogenizer is one or more integrator lenses, and wherein the uniform pattern is focused by a focus lens.

13. The method according to claim 10, wherein the synchronization is performed at least three times utilizing three different spectra.

14. The method according to claim 10, further comprising:
configuring a size of an illumination field covered by the uniform pattern utilizing the focus lens.

15. The method according to claim 10, wherein each of the dichroic filters are tilted at a different angle to tune the beams for each of the LEDs.

16. The method according to claim 15, further comprising:
dynamically tuning the dichroic filters to reach the narrow band wavelengths.

17. The method according to claim 10, further comprising:
sensing the absorption and reflection of the uniform patter off of the object, wherein the object is organic.

18. The method according to claim 10 further comprising:
polarizing the uniform pattern prior to the illuminating the target with the uniform pattern.

19. A hyperspectral illuminator, comprising:
an LED for generating light of a predefined spectra;
a collimator associated with the LED arranged to focus the light into a beam;
a dichroic filter adapted to filter the beam; and
an integrator lens for mixing the filtered beam into a uniform pattern for projection on to a target.

20. The hyperspectral illuminator of claim 19 further comprising a polarizer disposed between the integrator lens and the target, wherein the uniform pattern is polarized prior to projection on to the target.

* * * * *

UNITED STATES PATENT AND TRADEMARK OFFICE
CERTIFICATE OF CORRECTION

PATENT NO.         : 8,792,098 B2                                         Page 1 of 1
APPLICATION NO.    : 13/487127
DATED              : July 29, 2014
INVENTOR(S)        : Dewald et al.

It is certified that error appears in the above-identified patent and that said Letters Patent is hereby corrected as shown below:

In the claims

Column 11, line 11, claim 17 "sensing the absorption and reflection of the uniform patter" should read "sensing the absorption and reflection of the uniform --pattern--".

Column 11, line 14, claim 18 "polarizing the uniform pattern prior to the illuminating the" should read "polarizing the uniform pattern prior to the --step of-- illuminating the".

Signed and Sealed this
Twenty-second Day of March, 2016

Michelle K. Lee
*Director of the United States Patent and Trademark Office*